(12) United States Patent
Song et al.

(10) Patent No.: US 11,714,459 B2
(45) Date of Patent: Aug. 1, 2023

(54) STORAGE MEDIUM TRAY STRUCTURE AND ELECTRONIC DEVICE COMPRISING SAME

(71) Applicant: Samsung Electronics Co., Ltd., Gyeonggi-do (KR)

(72) Inventors: Junhyeok Song, Gyeonggi-do (KR); Backman Kim, Gyeonggi-do (KR); Kwangsik Yang, Gyeonggi-do (KR); Wonku Yeo, Gyeonggi-do (KR); Sunghyun Yoo, Gyeonggi-do (KR); Seokho Lee, Gyeonggi-do (KR); Hwanju Jo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 17 days.

(21) Appl. No.: 17/479,469

(22) Filed: Sep. 20, 2021

(65) Prior Publication Data

US 2022/0075425 A1 Mar. 10, 2022

Related U.S. Application Data

(63) Continuation of application No. PCT/KR2020/003647, filed on Mar. 17, 2020.

(30) Foreign Application Priority Data

Mar. 19, 2019 (KR) .................. 40-2019-0031021

(51) Int. Cl.
*G06F 1/16* (2006.01)
(52) U.S. Cl.
CPC .................. *G06F 1/1658* (2013.01)
(58) Field of Classification Search
CPC .............. G06F 1/1656; G06F 1/1658
See application file for complete search history.

(56) References Cited

U.S. PATENT DOCUMENTS 8,186,726 B2 * 5/2012 Zuo ............ H04M 1/0274
292/DIG. 53
8,591,240 B2 * 11/2013 Jenks ............ H01R 13/62905
439/159

(Continued)

FOREIGN PATENT DOCUMENTS

JP 2018-195379 12/2018
KR 10-2016-0020011 2/2016

(Continued)

OTHER PUBLICATIONS

International Search Report dated Jun. 26, 2020 issued in counterpart application No. PCT/KR2020/003647, 5 pages.

(Continued)

*Primary Examiner* — Adrian S Wilson
(74) *Attorney, Agent, or Firm* — The Farrell Law Firm, P.C.

(57) ABSTRACT

An electronic device is provided that includes a housing having a first side with an insertion hole. The electronic device also includes a first tray configured to accommodate at least a subscriber identity module (SIM). The first tray is inserted into the housing through the insertion hole and is removably accommodated within the housing. The electronic device further includes a second tray configured to accommodate at least a memory card. The second tray is inserted into the housing through the insertion hole and is removably accommodated within the housing. In a state of being accommodated within the housing, the first tray and the second tray are at least partially disposed on the same plane, and at least a portion of the second tray is exposed to an outer surface of the housing while closing the insertion hole.

19 Claims, 11 Drawing Sheets

(56) References Cited

U.S. PATENT DOCUMENTS

| | | | |
|---|---|---|---|
| 8,614,897 B2* | 12/2013 | Tang | G06K 13/06 |
| | | | 361/752 |
| 9,787,342 B2* | 10/2017 | Kole | H04B 1/3816 |
| 10,314,187 B2* | 6/2019 | Lee | H05K 7/1401 |
| 10,488,889 B2* | 11/2019 | Lee | H04M 1/026 |
| 10,656,681 B2* | 5/2020 | Choi | G06F 1/1656 |
| 11,119,541 B2* | 9/2021 | Choi | H04B 1/3818 |
| 2002/0168900 A1 | 11/2002 | Chen | |
| 2009/0256364 A1* | 10/2009 | Gadau | G06F 1/1616 |
| | | | 361/679.55 |
| 2010/0234070 A1* | 9/2010 | Li | H04B 1/3816 |
| | | | 455/90.3 |
| 2011/0255252 A1* | 10/2011 | Sloey | G06K 13/0831 |
| | | | 361/752 |
| 2013/0059478 A1 | 3/2013 | Liu et al. | |
| 2013/0309885 A1* | 11/2013 | Liu | H01R 13/629 |
| | | | 439/153 |
| 2014/0029206 A1* | 1/2014 | Wittenberg | H05K 3/00 |
| | | | 29/829 |
| 2014/0078682 A1* | 3/2014 | Jenks | H01R 13/62905 |
| | | | 361/727 |
| 2014/0092532 A1* | 4/2014 | Kole | H04M 1/0249 |
| | | | 361/679.01 |
| 2014/0113495 A1 | 4/2014 | Lim et al. | |
| 2014/0177144 A1* | 6/2014 | Wu | G06K 13/0818 |
| | | | 361/679.01 |
| 2014/0218877 A1* | 8/2014 | Wei | H05K 5/03 |
| | | | 361/752 |
| 2014/0362548 A1* | 12/2014 | Liu | G06K 13/0831 |
| | | | 312/333 |
| 2016/0113142 A1* | 4/2016 | Moon | H05K 7/1402 |
| | | | 361/807 |
| 2016/0164204 A1* | 6/2016 | Cho | G06K 19/07739 |
| | | | 439/529 |
| 2016/0164226 A1* | 6/2016 | Hirata | H04B 1/3816 |
| | | | 439/155 |
| 2016/0266619 A1* | 9/2016 | Heiskanen | G06F 1/1656 |
| 2016/0360632 A1 | 12/2016 | Lee et al. | |
| 2017/0025785 A1* | 1/2017 | Song | H01R 13/631 |
| 2017/0162982 A1* | 6/2017 | Wu | H01R 12/71 |
| 2018/0132369 A1 | 5/2018 | Lee et al. | |
| 2018/0332725 A1 | 11/2018 | Orui et al. | |
| 2019/0243425 A1* | 8/2019 | Choi | H05K 5/06 |
| 2020/0257340 A1* | 8/2020 | Choi | G06F 1/1658 |
| 2021/0373608 A1* | 12/2021 | Choi | G06F 1/1656 |

FOREIGN PATENT DOCUMENTS

| | | |
|---|---|---|
| KR | 10-2016-0142186 | 12/2016 |
| KR | 10-2018-0006707 | 1/2018 |
| KR | 10-2018-0051249 | 5/2018 |

OTHER PUBLICATIONS

Written Opinion dated Jun. 26, 2020 issued in counterpart application No. PCT/KR2020/003647, 5 pages.

* cited by examiner

STORAGE MEDIUM TRAY STRUCTURE AND ELECTRONIC DEVICE COMPRISING SAME

CROSS-REFERENCE TO RELATED APPLICATION(S)

This application is a continuation of international Application No. PCT/KR2020/003647, which was filed on Mar. 17, 2020, and is based on and claims priority under 35 U.S.C. § 119 to Korean Patent Application No. 10-2019-0031021, which was filed in the Korean Intellectual Property Office on Mar. 19, 2019, the entire disclosure of each of which is incorporated herein by reference

BACKGROUND

1. Field

The disclosure relates generally to a storage medium tray structure and an electronic device, and more particularly, to a tray structure that enables a storage medium to be removably mounted, and an electronic device including the same.

2. Description of Related Art

The storage capacity or communication function of an electronic device may be expanded through various types of storage media. For example, memory cards, such as a secure digital (SD) card, are gradually getting smaller while the capacities thereof are increasing. Data processing speeds (e.g., read write speeds) of memory cards are also gradually being improved. The data storage capacity of a memory mounted in an electronic device may significantly affect consumer price, and a consumer may purchase an electronic device having a limited storage capacity based on their circumstances. A manufacturer may manufacture an electronic device such that a memory card can be mounted in the electronic device, and a consumer may expand the data storage capacity of the electronic device using an external storage medium, such as, for example, an external memory card. Such a memory card is loaded with various types of applications, and when the memory card is mounted on an electronic device, the memory card may expand the functions of the electronic device and may be used to move data of the electronic device to another electronic device.

A storage medium may include a subscriber identity module (SIM) used as user authentication means. For example, a consumer may purchase a SIM from a communication company to access a commercialized communication network.

According to a communication function provided in the electronic device, the consumer may perform wireless communication with a communication network or other nearby electronic devices by including a communication protocol, such as, for example, a wireless local area network (LAN) or Bluetooth.

A tray structure may be provided in a miniaturized electronic device, such as a mobile communication terminal, so that such a memory card can be mounted thereon together with a SIM. For example, a miniaturized electronic device may be equipped with a plurality of storage media using a single tray structure. In general, ordinary consumers have used a SIM mounted on a miniaturized device, such as a mobile communication terminal, but there is an increasing demand for mounting a SIM in other types of electronic devices, such as, for example, a notebook computer. As speed and capacity increase in wireless communication technology, consumer demand for mounting a SIM in a portable electronic device, such as a tablet PC or a notebook computer, is also increasing.

In an environment in which a memory card is frequently separated, mounted, and moved for data movement between electronic devices, when a SIM and a memory card are mounted in a single tray structure, it may cause inconvenience for the user. For example, the memory card can be dismounted by executing a software command in the electronic device, so there is no need to turn off the power of the electronic device. In contrast, when the SIM is disconnected from the electronic device while the power is on, the SIM may be damaged or a software error of the electronic device may occur. Therefore, when the SIM and the memory card are mounted together in a single tray structure, it is necessary to turn off the power of the electronic device in order to separate the memory card. As described above, since the memory card may be frequently separated from and mounted in the electronic device, when the memory card is mounted together with the SIM in a single tray structure, it may cause inconvenience for the user.

SUMMARY

In accordance with an aspect of the disclosure, an electronic device is provided, which includes a tray structure in which a plurality of storage media, for example, a SIM and a memory card, can be individually mounted.

In accordance with an aspect of the disclosure, an electronic device is provided, which includes a tray structure that provides an environment in which a plurality of storage media can be mounted, and one storage medium (e.g., a memory card) can be independently separated from the electronic device with respect to another storage medium (e.g., a SIM).

In accordance with an aspect of the disclosure, an electronic device is provided in which a portion on which one storage medium is mounted (hereinafter, a first tray) and a portion on which another storage medium is mounted (hereinafter, a second tray) are coupled to form a single tray structure in appearance while allowing a plurality of storage media to be mounted thereon, and the second tray is independently separable from the first tray.

In accordance with an aspect of the disclosure, an electronic device is provided, which includes a housing including a first side with an insertion hole. The electronic device also includes a first tray configured to accommodate at least a SIM. The first tray is inserted into the housing through the insertion hole and is removably accommodated within the housing. The electronic device further includes a second tray configured to accommodate at least a memory card. The second tray is inserted into the housing through the insertion hole and is removably accommodated within the housing. In a state of being accommodated within the housing, the first tray and the second tray are at least partially disposed on a same plane, and at least a portion of the second tray is exposed to an outer surface of the housing while closing the insertion hole.

In accordance with an aspect of the disclosure, a storage medium mounting tray structure of an electronic device is provided, which includes a first tray configured to accommodate a SIM. The first tray is inserted into a housing of the electronic device and is removably accommodated within the housing of the electronic device. The tray structure also includes a second tray configured to accommodate a memory card. The second tray is inserted into the housing of the electronic device and is removably accommodated within the housing of the electronic device. In a state of being accommodated within the housing of the electronic device, the first tray and the second tray are at least partially disposed on a same plane, and the second tray may include a tray header exposed to an outer surface of the housing.

In accordance with an aspect of the disclosure, an electronic device is provided; which includes a housing including a first side with an insertion hole. The electronic device also includes a first manipulating recess provided in an outer surface of the housing and in contact with the insertion hole. The electronic device further includes a tray structure including a first tray inserted into the housing through the insertion bole and removably accommodated within the housing, and a second tray inserted into the housing through the insertion hole and removably accommodated within the housing. In a state of being accommodated within the housing, the first tray and the second tray are at least partially disposed on a same plane, and at least a portion of the second tray is exposed to the outer surface of the housing while closing the insertion hole.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
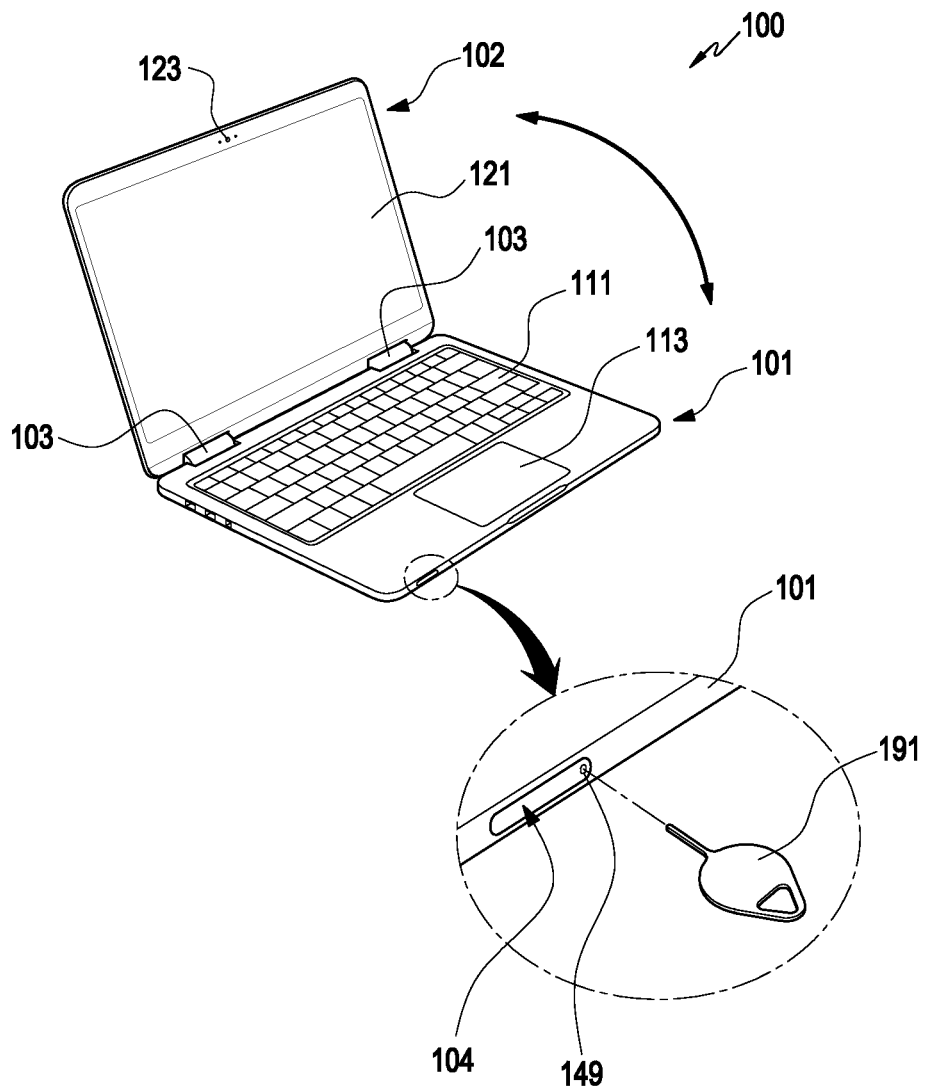
FIG. 1 is a diagram illustrating a perspective view of an electronic device, according to an embodiment.

The disclosure may have various embodiments, and various modifications and changes may be made to the embodiments of the disclosure. Hereinafter, some of the embodiments will be described in detail with reference to the accompanying drawings. However, this is not intended to limit the disclosure to particular embodiments, and it should be appreciated that the disclosure includes all changes, equivalents, or alternatives falling within the technical idea and scope of the disclosure.

With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "al least one of A, B, or C," may include all possible combinations of the items enumerated together in a corresponding one of the phrases. The terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes any combination of a plurality of relevant items or nay one of the plurality of relevant items. When an element (e.g., first element) is referred to, with or without the term "operatively" or "communicatively", as "coupled with," "coupled to," "connected with," or "connected to" another element (e.g., second element), it means that, the element may be coupled or connected to or with the other element directly (e.g., wiredly), wirelessly, or via a third element.

Further, relative terms described as viewed from the drawings, such as "front surface", "rear surface". "top surface", and "bottom surface", may be replaced by ordinal numbers such as "first" and "second". In the ordinal numbers such as "first" and "second", the order of them is determined in the mentioned order or arbitrarily and may be arbitrarily changed as necessary.

The terms used in the disclosure are only used to describe specific embodiments, and are not intended to limit the disclosure. A singular expression may include a plural expression unless they are definitely different in a context. In the disclosure, it should be appreciated that the expression "include" or "have" is intended to refer to the existence of a corresponding feature, numeral, step, operation, constituent element, component, or a combination thereof, and does not exclude the existence or addition of one or more other features, numerals, steps, operations, constituent elements, components, or a combination thereof.

Unless defined otherwise, all terms used herein, including technical and scientific terms, have the same meaning as those commonly understood by a person skilled in the art to which the disclosure pertains. Such terms as those defined in a generally used dictionary should be interpreted to have the meanings equal to the contextual meanings in the relevant field of art, and are not to be interpreted to have ideal or excessively formal meanings unless clearly defined in the disclosure.

In the disclosure, the electronic device may be any device including a touch panel, and the electronic device may be referred to as a terminal, a portable terminal, a mobile terminal, a communication terminal, a portable communication terminal, a portable mobile terminal, or a display device.

For example, the electronic device may include a smartphone, a mobile phone, a navigation device, a game console, a TV, an in-vehicle head unit, a notebook computer, a laptop computer, a tablet computer, a personal media player (PMP), or a personal digital assistant (PDA). The electronic device may be implemented as a pocket-sized portable communication terminal having a wireless communication function. In addition, the electronic device may be a flexible device or a flexible display device.

The electronic device may communicate with an external electronic device, such as a server, or may perform a task through interworking with an external electronic device. For example, the electronic device may transmit an image captured using a camera and/or location information detected by a sensor unit to a server through a network. The network may be, but is not limited to, a mobile or cellular network, a local area network (LAN), a wireless local area network (AVIAN), a wide area network (WAN), the Internet, or a small area network (SAN).

According to embodiments herein, a tray structure includes a first tray and a second tray, which are sequentially inserted into the housing through one insertion hole. The second tray can be separated from the housing independently of the first tray. For example, when an additional device that is frequently mounted in or separated from the electronic device, such as a memory card, is mounted on the second tray, the additional device can be conveniently separated from the electronic device without turning off the power of the electronic device. As a structure in which the first and second trays are inserted into the housing through one insertion hole, the second tray may be disposed to close the insertion hole while being inserted into the housing. For example, by minimizing the number of insertion holes while providing an environment in which a plurality of storage media can be mounted and separated, it is possible to alleviate or prevent a sense of heterogeneity due to the insertion holes in the exterior of the electronic device (e.g., the outer surface of the housing).

FIG. 1 is a diagram illustrating a perspective view of an electronic device, according to an embodiment.

Referring to FIG. 1, an electronic device 100 is, for example, a notebook computer, and may include a first housing 101 and a second housing 102 rotatably coupled to each other. For example, by pivotally coupling the first housing 101 and the second housing 102 to each other via a hinge device 103, the housings may be unfolded from a position at which the housings are folded to face each other in a position at which the housings are opened to be inclined with respect to each other at an arbitrary angle. In some embodiments, the first housing 101 and the second housing 102 may be unfolded to a position in which the housings form an angle of 180 degrees therebetween or folded to a state in which a keyboard 111 and a display device 121 of FIG. 1 are oriented in opposite directions to each other.

A circuit board, on which various electronic components, such as, for example, a processor, a memory, a communication module, and an interface, are mounted, and/or a battery may be embedded in the first housing 101. Input devices such as the keyboard 111 and a touch pad 113 are disposed on one surface of the first housing 101, and when the first housing 101 and the second housing 102 are folded to face each other, the keyboard 111 or the touch pad 113 may be closed. Connection terminal(s) for connection with other external devices, such as, for example, a power connector, a universal serial bus (USB) connector, and a high-definition multimedia interface (HDMI) connector, may be disposed on the side(s) of the first housing 101.

An insertion hole 161 (see FIG. 3), described in greater detail below, is provided on one side of the first housing 101 so that a tray structure 104 can be inserted into the interior of the first housing 101 therethrough. The tray structure 104 may include a through hole 149 (e.g., a pin hole), and a user may at least partially release the tray structure 104 from the first housing 101 by inserting an external member 191 (e.g., a separating pin) into the through hole 149 and pushing the external member 191. As described with reference to FIGS. 2 and 11, the external force by the external member 191 can be transmitted through a separation device (e.g., a separation device 405 in FIG. 11) so that the tray structure 104 can be released from the first housing 101.

The display device 121 and/or a camera device 123 is mounted on one surface of the second housing 102. The display device 121 may include a touch panel or a digitizer, and thus, the display device 121 may be utilized as an input device together with the keyboard 111 while outputting visual information. The camera device 123 may perform photographing in a screen output direction of the display device 121 and may detect information for the use environment of the electronic device 100 (e.g., illuminance) or user authentication (e.g., facial recognition), according to a program installed in the electronic device 100 or commands.

Although FIG. 1 describes the electronic device 100 as a notebook computer, a mounting structure (e.g., a structure for mounting the tray structure 104) described in greater detail below or the tray structure 104 configured to be mounted in and separated from such a mounting structure may be mounted in various types of electronic devices. For example, a mounting structure or a tray structure may be provided in other small and portable electronic devices, such as, for example, a tablet PC and a mobile communication terminal.

Hereinafter, a structure for mounting the tray structure 104 is described with reference to FIGS. 2 and 3.

Figure 2:
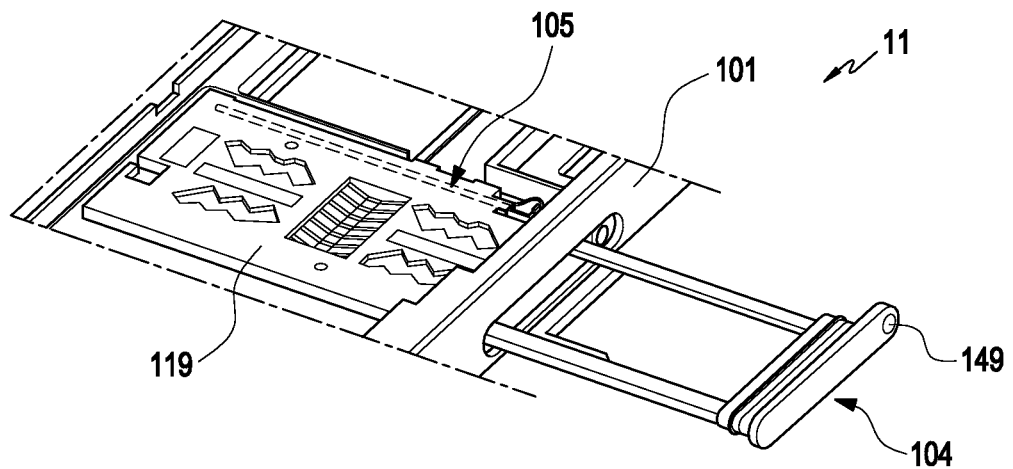
FIG. 2 is a diagram illustrating a perspective view of a storage medium mounting structure in an electronic device, according to an embodiment.

FIG. 2 is a diagram illustrating a perspective view of a storage medium mounting structure 11 in an electronic device 100, according to an embodiment. FIG. 3 is a diagram illustrating a perspective view of a configuration 13 of an insertion hole in an electronic device, according to an embodiment.

Figure 3:
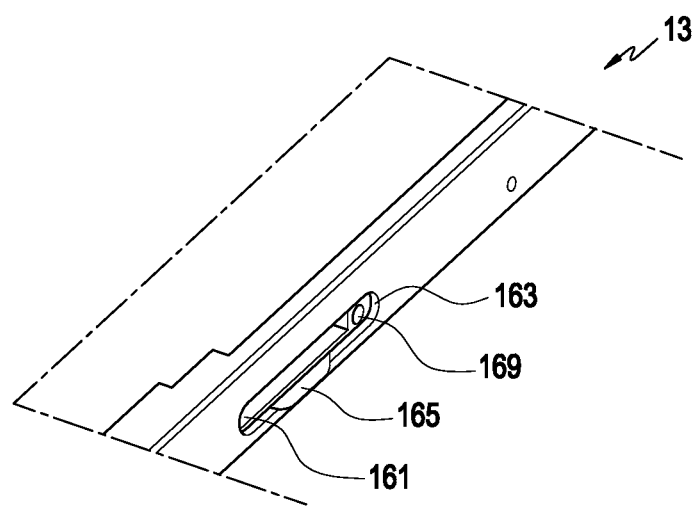
FIG. 3 is a diagram illustrating a perspective view of a configuration of an insertion hole in an electronic device, according to an embodiment.

Referring to FIGS. 2 and 3, the tray structure 104 may be a component for mounting a storage medium, such as a SIM or a memory card, in the electronic device 100 (e.g., the first housing 101). The tray structure 104 is inserted into the first housing 101 through an insertion hole 161 formed in one side of the first housing 101.

A socket 119 is mounted inside the first housing 101 in a state of being aligned with the insertion hole 161, For example, an inlet of the socket 119 may be located to face the insertion hole 161. The tray structure 104 may be inserted into the first housing 101 through the insertion hole 161, and may be at least partially mounted on or fixed to the socket 119 inside the first housing 101. A separation device 105 is provided at one side of the socket 119. The separation device 105 is aligned with the through hole 149 to transmit an external force applied by the external member 191. The separation device 105 may be partially disposed inside the socket 119, and may be disposed at one side of the socket 119.

The insertion hole 161 is formed through one side of the first housing 101 to connect the inner space of the first housing 101 to the outer space. For example, the insertion hole 161 may provide a path into which the tray structure 104 is inserted, and may provide means for supporting and fixing the inserted tray structure 104. The electronic device 100 further includes an accommodation recess 163 provided in the outer surface of the first housing 101 around the insertion hole 161. In the state of being mourned on the first housing 101, a portion of the tray structure 104 is located inside the accommodation recess 163 to close the insertion hole 161, and a portion of the surface of the tray structure 104 may be located on the same plane or a curved surface as the outer surface of the first housing 101.

Figure 6:
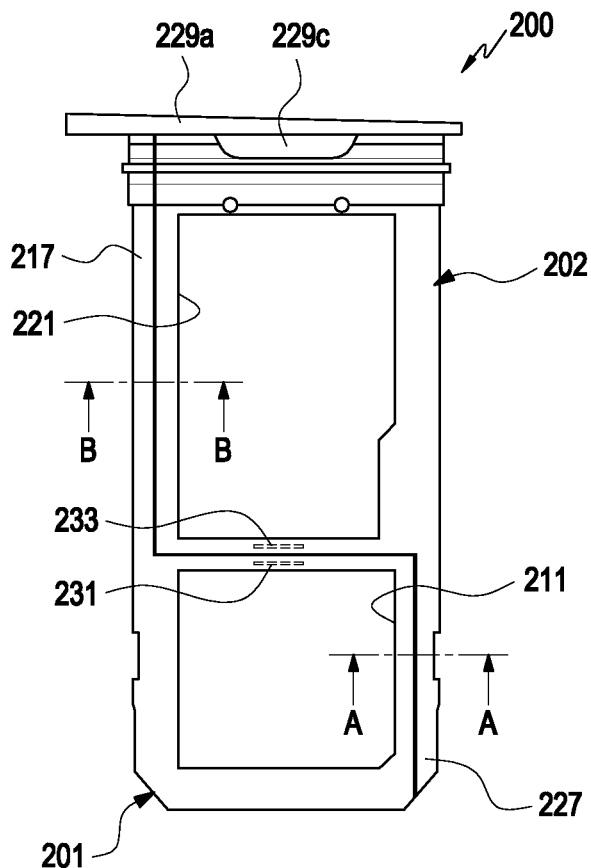
FIG. 6 is a diagram illustrating a bottom view of the tray structure of FIG. 4, according to an embodiment.

The electronic device 100 further includes another through hole 169 extending into the inside of the first housing 101 from the bottom of the accommodation recess 163 at one side of the insertion hole 161. The another through hole 169 is aligned with the through hole 149 in the tray structure 104. For example, in the state in which the tray structure 104 is inserted into and accommodated in the first housing 101, the external member 191 is partially inserted through the through holes 149 and 169, which are provided in the tray structure 104 and the first housing 101, respectively, to actuate the separation device 105. The electronic device 100 further includes a first manipulating recess 165 provided in the outer surface of the first housing 101. The first manipulating recess 165 is provided to be in contact with the insertion hole 161. A portion of the tray structure 104 may be exposed to the outside through the first manipulating recess 165 in a state in which the tray structure 104 is accommodated in the first housing 101. As shown in FIG. 6, the tray structure 104 may include a second manipulating recess 229c, and in the state in which the tray structure 104 is accommodated in the first housing 101, the second manipulating recess 229c may be exposed to the outside of the first housing 101 through the first manipulating recess 165. The user may separate a portion of the tray structure 104 from the first housing 101 using the second manipulating recess 229c even if the external member 191 is not used.

Figure 4:
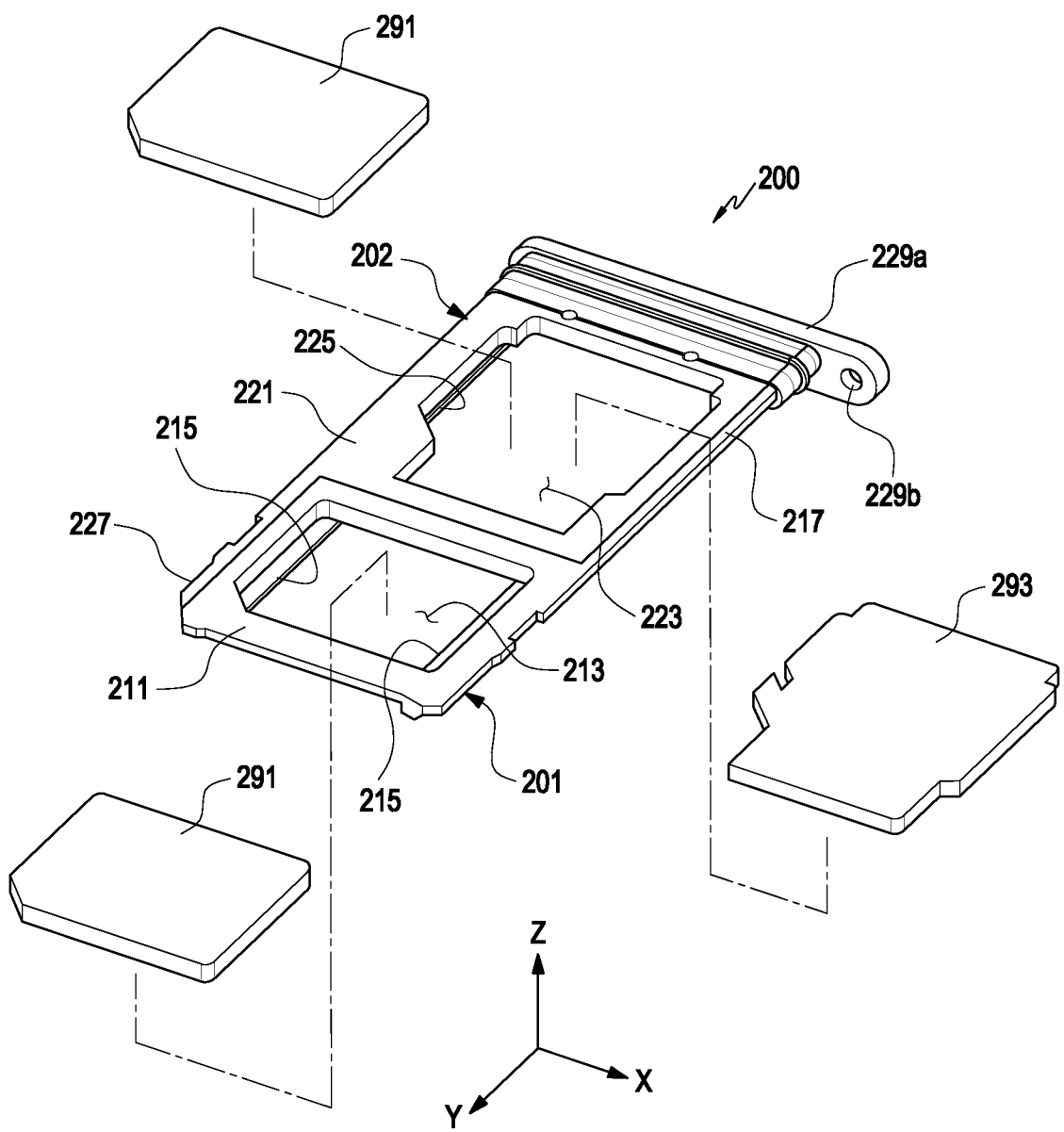
FIG. 4 is a diagram illustrating a perspective view of a tray structure of an electronic device, according to an embodiment.
Figure 5:
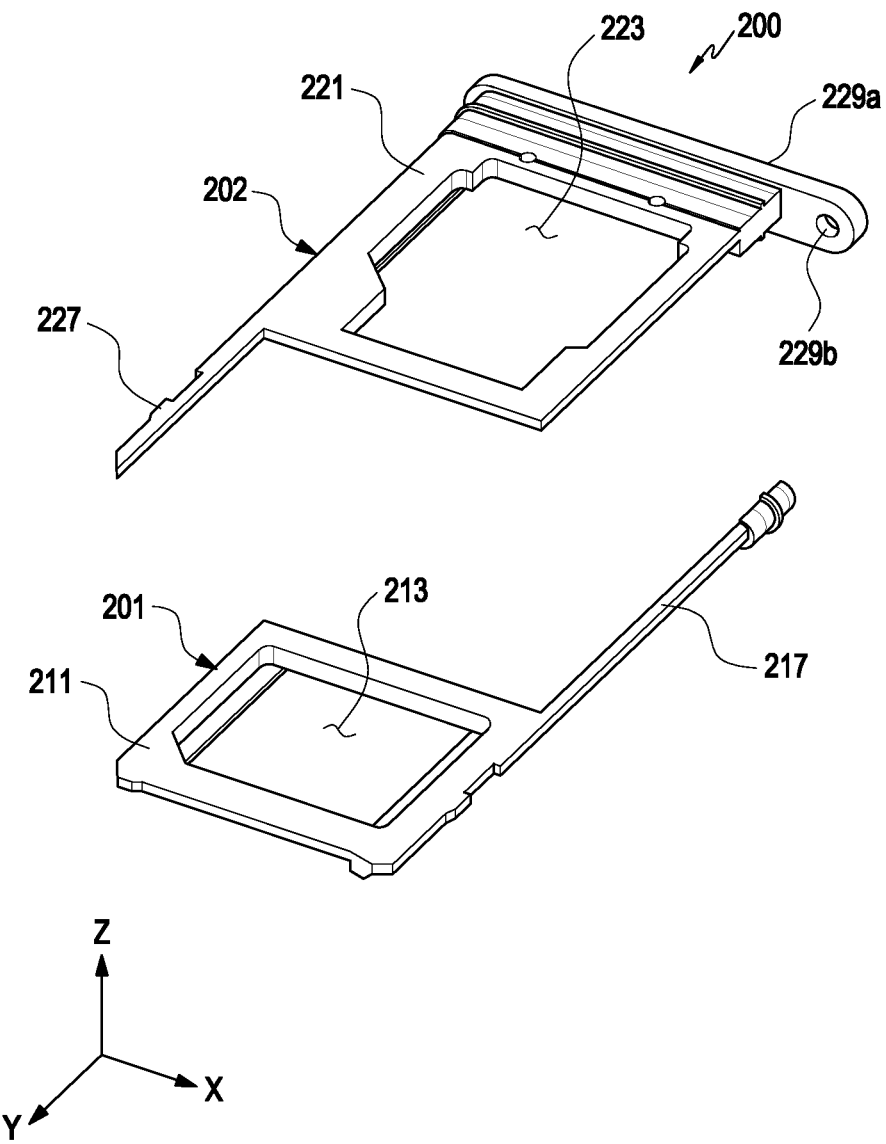
FIG. 5 is a diagram illustrating a perspective view of the tray structure of FIG. 4, according to an embodiment.
Figures 7, 8:
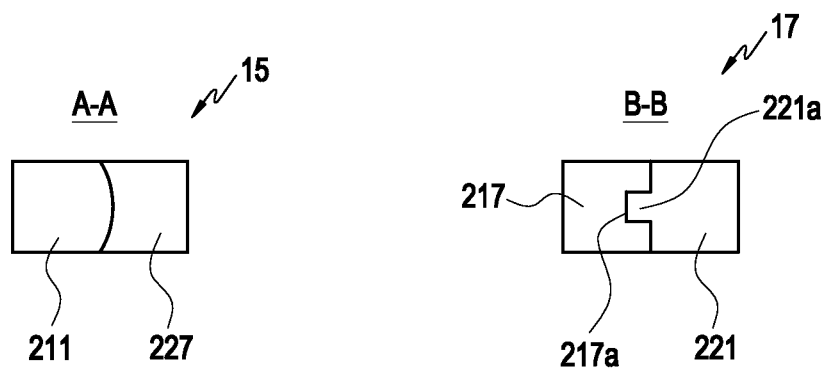
FIG. 7 is a diagram illustrating a cross-sectional view of the tray structure taken along line A-A in FIG. 6, according to an embodiment.
FIG. 8 is a diagram illustrating a cross-sectional view or the tray structure taken along line B-B in FIG. 6, according to an embodiment.

FIG. 4 is a diagram illustrating a perspective view of a tray structure 200 of an electronic device, according to an embodiment. FIG. 5 is a diagram illustrating a perspective view of the tray structure 200, according to an embodiment, FIG. 6 is a diagram illustrating a bottom view of the tray structure 200, according to an embodiment. FIG. 7 is a diagram illustrating a cross-sectional view 15 of the tray structure 200 taken along line A-A in FIG. 6, according to an embodiment. FIG. 8 is a diagram illustrating a cross-sectional view 17 of the tray structure 200 taken along line B-B FIG. 6, according to an embodiment.

Referring to FIGS. 4 and 5, the tray structure 200 includes a first tray 201 and a second tray 202 disposed to be coupled to or separated from each other. The first tray 201 may be inserted into the first housing 101 before the second tray 202, and in a state in which the tray structure 200 is mounted in the first housing 101, the second tray 202 may be released or separated from the first housing 101 independently of the first tray 201. For example, regardless of whether the first tray 201 is mounted in a socket 119, the second tray 202 may be mounted in the first housing 101 or the socket 119.

The first tray 201 includes a first frame 211 defining a space (hereinafter, a first seating recess 213) configured to accommodate a storage medium, and a first guide portion 217 extending from one side of the first frame 211. The first guide portion 217 extends along a direction in which the tray structure 200 is inserted (or a reverse direction thereof). The first seating recess 213 is a space for accommodating a storage medium, for example, a SIM 291, and generally has a shape penetrating the top and bottom surfaces of the first tray 201. However, a rib 215, configured to support a storage medium, partially surrounds the first seating recess 213 in the bottom surface of the first tray 201.

The second tray 202 includes a second frame 221 defining a space (hereinafter, a second seating recess 223) configured to accommodate a storage medium, and a second guide portion 227 extending from one side of the second frame 221. The second guide portion 227 extends along a direction in which the tray structure 200 is inserted (or a reverse direction thereof). The second seating recess 223 is a space for accommodating a storage medium, for example, a memory card 293, and generally has a shape penetrating the top and bottom surfaces of the second tray 202. However, another rib 225, configured to support at least a storage medium, partially surrounds, the second seating recess 223 in the bottom surface of the second tray 202.

The first seating recess 213 and the second seating recess 223 may have various shapes. For example, although the example in which the memory card 293 is accommodated in the second seating recess 223 has been described above, the SIM 291 may be seated thereon. In another embodiment, the first seating recess 213 may be provided differently from the illustrated shape, and a storage medium other than the SIM 291 may be accommodated in the first seating recess 213 according to the shape of the first seating recess 213.

The memory card 293 may be an additional device that is more frequently attached and detached than the SIM 291 and may be mechanically separated from the electronic device 100 (e.g., the first housing 101) even in the state in which the power of the electronic device 100 remains on. However, in general, the SIM 291 may be mechanically separated in a state in which the power of the electronic device 100 is turned off. Considering this point, in the structure in which the first tray 201 and the second tray 202 are sequentially inserted into the first housing 101, for example, in the structure in which the second tray 202 is mounted outside the first tray 201 within the first housing 101, it is possible to reduce the frequency of power-off and the frequency of power-on required in the process of mounting and separating the memory card 293 by mounting the memory card 293 on the second tray 202. For example, it is possible to improve the user's convenience.

The tray structure 200 may have at least one flat plate shape in the state of being inserted or mounted in the first housing 101. For example, in the first housing 101, as illustrated in FIG. 4, the first tray 201 and the second tray 202 may be at least partially located on the same plane. The description "the first tray 201 and the second tray 202 are at least partially located on the same plane" may mean that the storage media (e.g., the SIM 291 and the memory card 293) accommodated in the first seating recess 213 and the second seating recess 223 may be at least partially located on the same plane. The storage media may each include electrical contact pads, wherein the description "the first tray 201 and the second tray 202 are at least partially located on the same plane" may mean that the contact pads of each of the storage media are aligned on the same plane in a state in which the tray structure is mounted in the first housing 101 or the socket 119. The term "same plane" may mean a plane substantially parallel to a direction in which the first tray 201 and the second tray 202 are inserted.

The tray structure 200 further includes a tray header 229a. The tray header 229a is disposed on one side edge of the second frame 221, and one surface of the tray header 229a is exposed to the outer surface of the first housing 101. For example, the tray header 229a is at least partially accommodated in the accommodation recess 163, and the outer surface of the tray header 229a may be located on the same plane or the same curved surface as the outer surface of the first housing 101 The through hole 149 in FIG. 2 may be a through hole 229b provided in the tray header 229a. For example, when the tray structure 200 or the second tray 202 is accommodated or mounted in the first housing 101, the tray header 229a may be accommodated in the accommodation recess 163, and the through hole 229h may be aligned with another through hole 169 in FIG. 3 provided in the housing 101.

A separation pin (e.g., the outer member 191 in FIG. 1) may enter the interior of the first housing 101 through the through hole 229b and/or the through hole 169 in FIG. 3. By using an external force applied through the external member 191, a separation device 105 in FIG. 2 may release at least the first tray 201 of the first tray 201 and the second tray 202 from the first housing 101. The description "releasing the first tray 201 from the first housing 101" may mean causing a portion of the first tray 201 to protrude to the outside of the first housing 101. As another meaning, the description "releasing the first tray 201 from the first housing 101" may mean completely separating the first tray 201 from the first housing 101. The description "releasing the first tray 201 from the first housing 101" may mean separating at least the first tray 201 from a socket 119. The description "separating at least the first tray 201 from the socket 119" may mean separating only the first tray 201 if the second tray 202 is already in the state of being separated from the socket 119, and may mean separating, while the first tray 201 is being separated from the socket 119, the second tray 202 as well from the socket 119 if the first tray 201 and the second tray 202 are in the state of being mounted in the socket 119.

The through hole 229h may not necessarily be provided. For example, the second tray 202 may have a structure that is separable by a user without using an external member. A second manipulating recess 229c provided in the second tray 202 may be exposed through the first manipulating recess 165 in FIG. 3. The user may separate the second tray 202 from the first housing 101 by bringing another tool or a portion of his/her body (e.g., a finger nail or fingertip) into close contact with the second manipulating recess 229c. If the first tray 201 is to be separated, the user may also separate the first tray 201 by using the external member 191 in the state in which the second tray 202 is separated. When the SIM (e.g., the SIM seated in the first tray 201) is not frequently separated from the electronic device, the through hole 169 in the first housing 101 may be closed using the tray header 229a as described above. For example, the through hole 229b may not be provided according to a manufacturer's selection in consideration of consumer preferences or trends in the communication market.

The first guide portion 217 may be provided to face, come into contact with, or surround the other side of the second frame 221. The second guide portion 227 may be provided to face, come into contact with, or surround the other side of the first frame 211. At least in the state in which the tray structure 200 is mounted in the first housing 101, the first tray 201 and the second tray 202 may be disposed to at least partially surround each other. For example, the first guide portion 217 and the second frame 221 may be disposed to face each other in the width direction X of the electronic device 100 or the tray structure 200.

The first guide portion 217 and the second guide portion 227 may guide the insertion and separation operations of at least the second tray 202. For example, each of the first guide portion 217 and the second guide portion 227 may extend along the insertion direction (e.g., the Y direction) of the first tray 201 or the second tray 202. When the second tray 202 is inserted, the first guide portion 217 may come into sliding contact with one side of the second frame 221 and the second guide portion 227 may come into sliding contact with one side of the first frame 211 to guide the second tray 202 to linearly move in the insertion direction (e.g., the Y direction).

Further, referring to FIG. 6, the tray structure 200 may include the above-described second manipulating recess 229c. The user may separate a portion of the tray structure 200, for example, the second tray 202 from the first housing 101 using the second manipulating recess 229c. When the second tray 202 is separated using the second manipulating recess 229c, the first tray 201 may maintain the state of being mounted in the first housing 101 or the socket 119.

When the tray header 229a is wider than the thickness of the second frame (e.g., the thickness measured in the Z direction), the second manipulating recess 229c is not necessarily provided. For example, when the tray header 229a is wider than the thickness of the second frame, in a state in which the tray structure 200 is mounted in the first housing 101, a space surrounded by a portion of the first manipulating recess 165, a portion of the second frame 221, and a portion of an inner surface of the tray header 229a may be provided. This space may be connected to the external space through the first manipulating recess 165, and the user may bring a tool or a nail into close contact with the inner surface of the tray header 229a in the corresponding space to separate the second tray 202 from the first housing 101.

Further, referring to FIGS. 6 and 7, the side surface of the first frame 211 and one surface of the second guide portion 227 may have curved surfaces corresponding to each other while facing each other, thereby providing a structure for guiding the insertion operation of the second tray 202. For example, the side surface of the first frame 211 may be a convexly curved surface, and the one surface of the second guide portion 227 may be a concavely curved surface corresponding to the side surface of the first frame 211. When the tray structure 200 is in a state of being mounted in the first housing 101, curved surfaces of the first frame 211 and the second guide portion 227 may be in close contact with each other. When the first tray 201 is in the state of being mounted in the first housing 101, the curved surfaces of the first frame 211 and the second guide portion 227 may be in sliding contact with each other to guide the insertion operation of the second tray 202 while the second tray 202 is being inserted.

Further, referring to FIGS. 6 and 8, by including guide rails 221a or a guide recess 217a, respectively provided on the side surface of the second frame 221 and the one surface of the first guide portion 217, a structure for guiding the insertion operation of the second tray 202 may be provided. For example, the guide rail 221a may protrude from the side surface of the second frame 221 at the other side and may extend along the insertion direction e.g., the Y direction) of the second tray 202. The guide recess 227a may be provided in the one surface of the first guide portion 217 and may extend along the insertion direction of the second tray 202.

The guide rail 221a may be provided on the first guide portion 217, and the guide recess 217a may be provided in the side surface of the second frame 221. When the first tray 201 is in a state of being mounted in the first housing 101, the guide rail 221a and the guide recess 217a may be engaged with each other and be in sliding contact with each other to guide the insertion operation of the second tray 202 while the second tray 202 is being inserted.

The guide structure in FIG. 7 or FIG. 8 may be optionally provided. For example, the guide structure in FIG. 7 may be implemented to be the same as or similar to the first guide portion 217 and the second guide portion 227, and the guide structure of FIG. 8 may be implemented to be the same as or similar to the first guide portion 217 and the second guide portion 227. The guide structure may be implemented to be different from the shape or position of FIG. 7 or FIG. 8.

The tray structure 200 further includes a first magnetic body 231 and a second magnetic body 233. The first magnetic body 231 is disposed on the first tray 201, for example, the first frame 211, and the second magnetic body 233 is disposed on the second tray 202, for example, the second frame 221. When the second tray 202 is coupled to the first tray 201, the first magnetic body 231 and the second magnetic body 233 may be disposed adjacent to each other to obtain an attraction force. For example, the second tray 202 may be stably coupled to the first tray 201 by the attraction force generated by the first magnetic body 231 and the second magnetic body 233.

Figure 9:
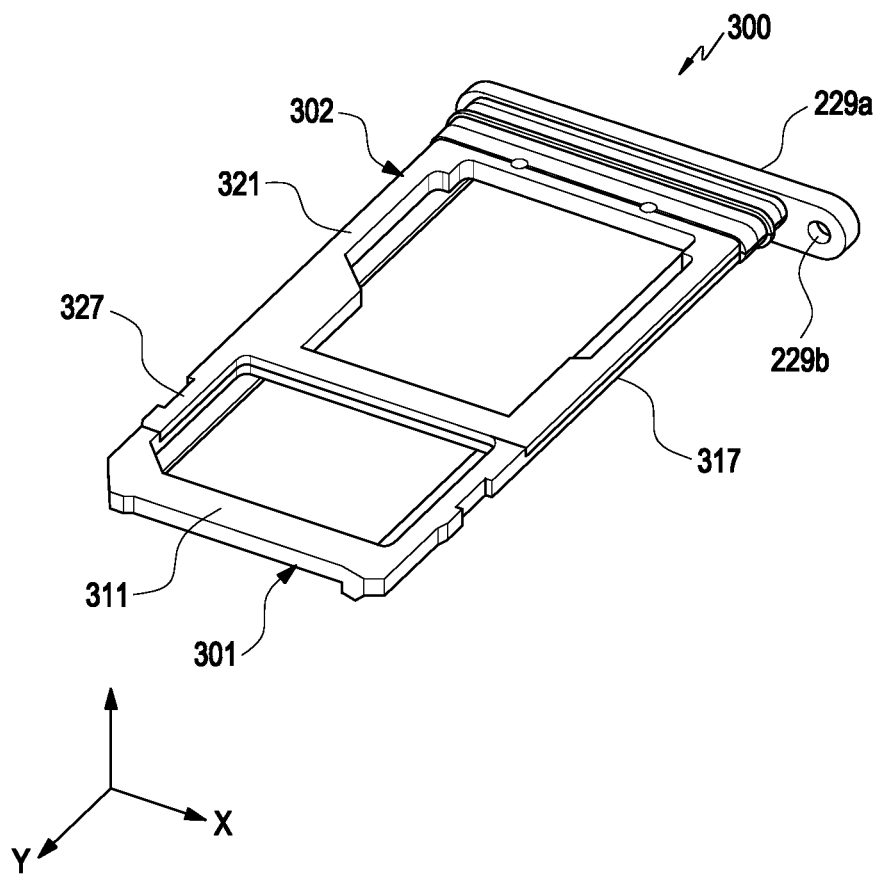
FIG. 9 is a diagram illustrating a perspective view of a tray structure of an electronic device, according to another embodiment.

The first guide portion 217 and the second frame 221, or the second guide portion 227 and the first frame 211 are disposed to face each other in the thickness direction (e.g., the Z direction) of the electronic device 100 or the tray structure (e.g., a tray structure 300 in FIG. 9). This arrangement structure is described in greater detail with reference to FIG. 9. In the following detailed description, the components, which can be easily understood through the preceding embodiments, may be denoted by the same reference numerals as the preceding embodiments or the reference numerals for the components may be omitted, and the detailed description thereof may also be omitted.

Figure 10:
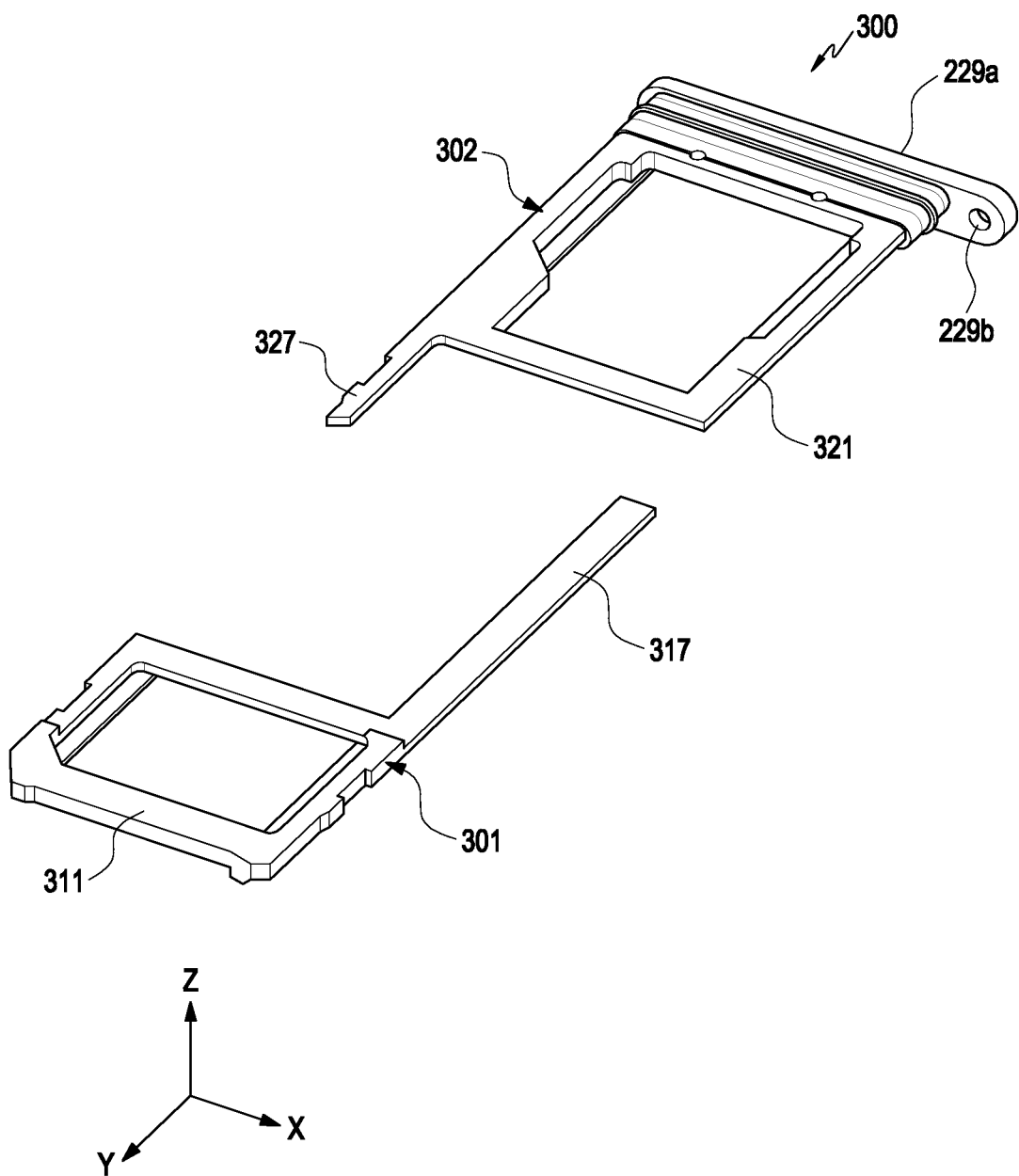
FIG. 10 is a diagram illustrating a perspective view of the tray structure of FIG. 9, according to an embodiment.

FIG. 9 is a diagram illustrating a perspective view of a tray structure 300 of an electronic device, according to an embodiment. FIG. 10 is a diagram illustrating a perspective view of the tray structure 300 of FIG. 9, according to an embodiment.

Referring to FIGS. 9 and 10, the tray structure 300 includes a first tray 301 and a second tray 302. When, the tray structure 300 is mounted in a housing 101 of an electronic device 100, the first tray 301 and the second tray 302 may be at least partially aligned on the same plane. The tray structure 300 further includes the tray header 229a disposed at one side of the second tray 302, While the tray header 229a closes the accommodation recess 163 provided in the first housing 101, a portion (e.g., the outer surface) of the tray header 229a may be located on the same plane or curved plane as the outer surface of the first housing 101, The tray header 229a includes the through hole 229h corresponding to a through hole 169 provided in the first housing 101, and the through holes 169 and 229h may be aligned with each other to provide a path through which a separation pin (e.g., the external member 191 in FIG. 1) enters the interior of the first housing 101.

The first tray 301 includes a first frame 311 and a first guide portion 317. The first frame 311 may define a space for accommodating a storage medium, for example, a SIM, and the first guide portion 317 extends from one side of the first frame 311 along an insertion direction (e.g., the Y direction) of the first tray 301 or the second tray 302.

The second tray 302 includes a second frame 321 and a second guide portion 327. The second frame 321 may define a space for accommodating a storage medium, for example, a SIM or a memory card, and the second guide portion 327 extends from one side of the second frame 321 along an insertion direction (e.g., the Y direction) of the first tray 301 or the second tray 302.

When the first tray 301 and the second tray 302 are coupled to each other, the first guide portion 317 may be disposed to face a portion of the bottom surface of the second frame 321, and the second guide portion 327 may be disposed to face a portion of the top surface of the first frame 311. For example, the first guide portion 317 may be disposed to face a portion of the second frame 321 in the thickness direction (e.g., the Z direction), and the second guide portion 327 may be disposed to face a portion of the first frame 311 in the thickness direction. The lower surface of the first guide portion 317 may be aligned with the lower surface of the second frame 321 on the same plane, and the upper surface of the second guide portion 327 may be aligned with the upper surface of the first frame 311 on the same plane. When the first tray 301 and the second tray 302 are coupled to each other, the storage media accommodated respectively in the first tray 301 and the second tray 302 may be aligned with each other on the same plane.

Figure 11:
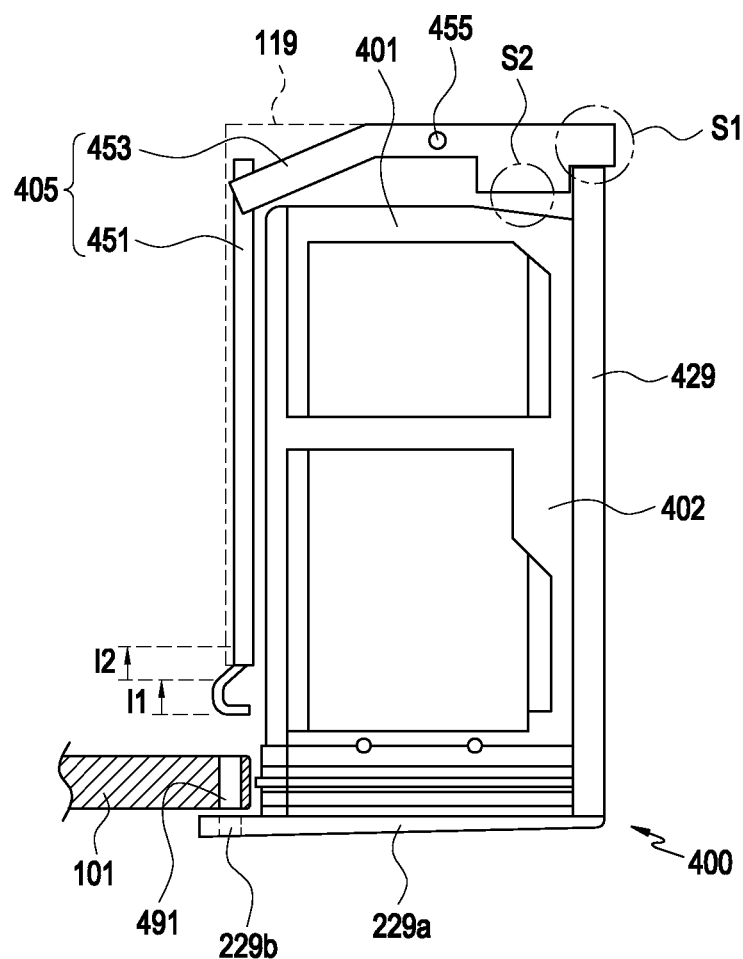
FIG. 11 is a diagram illustrating a plan view of a modification of the storage medium mounting structure in an electronic device, according to an embodiment.
Figure 12:
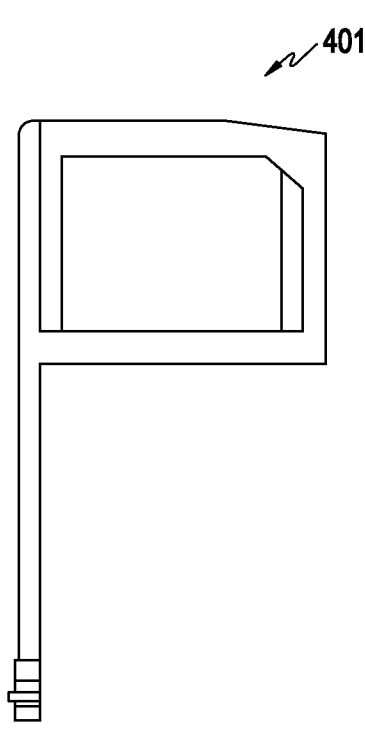
FIG. 12 is a diagram illustrating a plan view of a first tray in the mounting structure of FIG. 11, according to an embodiment.
Figure 13:
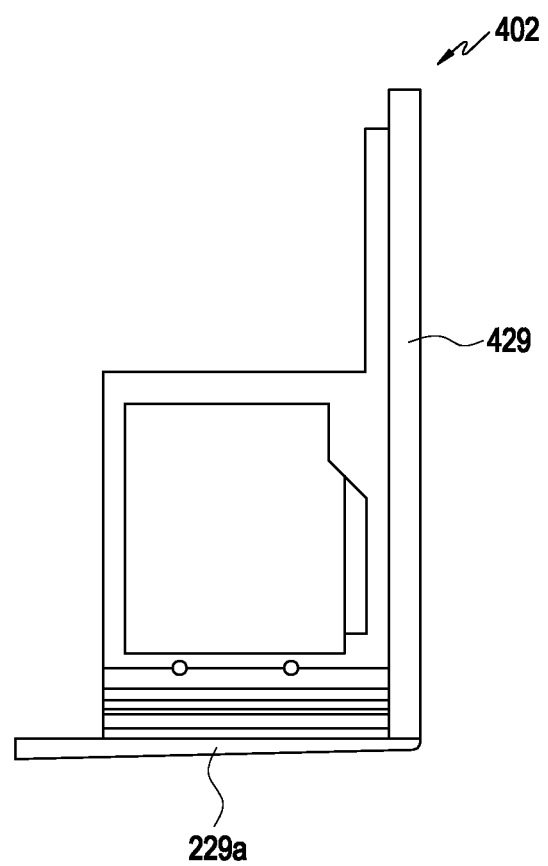
FIG. 13 is a diagram illustrating a plan view of a second tray in the mounting structure of FIG. 11, according to an embodiment.

FIG. 11 is a diagram illustrating a plan view of a modification of a storage medium mounting structure in an electronic device 100, according, to an embodiment, FIG. 12 is a diagram illustrating a plan view of a first tray 401 in the mounting structure of FIG. 11, according to an embodiment. FIG. 13 is a diagram illustrating a plan view of a second tray 402 in the mounting structure of FIG. 11, according to an embodiment.

Referring to FIGS. 11 to 13, the socket 119 aligned with the insertion hole 161 is mounted inside the first housing 101, and a first tray 401 and a second tray 402 constituting the tray structure 400 are at least partially mounted in the socket 119 inside the first housing 101. The tray structure 400 may at least partially include the tray structures 200 and 300 in FIG. 4 or FIG. 9, and as illustrated in FIG. 12 or FIG. 13, the first tray 401 and the second tray 402 may be slightly different from those of the previous embodiment in shape. A separation device 405 for separating the tray structure 400 is provided inside the first housing 101.

The first housing 101 includes a first pin hole 491 (e.g., the through hole 169 in FIG. 3) provided therethrough at one side of the insertion hole 161 in the direction in which the first tray 401 or the second tray 402 is inserted. The tray structure 400 includes a through hole 229b provided in the tray header 229a, fir example, the through hole 229b in FIG. 4. In a state in which the tray structure 400 is mounted in the socket 119, the through hole 229b is aligned with the first pin hole 491 to provide a path through which a separation pin (e.g., the external member 191 in FIG. 1) enters the interior of the first housing 101.

The separation device 405 includes a first push rod 451 disposed inside the first housing 101 and aligned with the first pin hole 491. The first push rod 451 is disposed at one side of the socket 119 or inside the socket 119, and in a state in which one end of the first push rod 451 is aligned with the first pin hole 491, the first push rod 451 may extend along the direction in which the first tray 401 or the second tray 402 is inserted. A separation pin (e.g., the external member 191 in FIG. 1) may enter the interior of the first housing 101 through the first pin hole 491 to press the first push rod 451.

The first push rod 451 may linearly move by the external force applied via the external member 191.

When the tray structure 400 is inserted into and mounted in the socket 119, one end of the first push rod 451 may move to a position adjacent to the first pin hole 491 and, when an external force is applied thereto by the external member 191, the first push rod 451 may transmit the external force while moving in a direction away from the first pin hole 491, For example, when the tray structure 400 is mounted on the socket 119 or when an external force is applied by the external member 191, the first push rod 451 may linearly move in the direction in which the tray structure 400 is inserted, or in a direction opposite thereto.

The mounting structure or the separation device 405 described above includes a first pivoting rod 453 that rotates according to a linear reciprocating motion of the first push rod 451. The first pivoting rod 453 is pivotally mounted inside the socket 119 or the first housing 101 via a first pivot pin 455. The first pivoting rod 453 may pivot about the first pivot pin 455 while interacting with the other end of the first push rod 451. For example, when the first push rod 451 linearly moves, the first pivoting rod 453 may pivot about the first pivot pin 455 while interacting with the other end of the first push rod 451.

The tray structure 400 includes an interference member 429 extending to one side of the second tray 402 and disposed parallel to one side of the first tray 401. An end of the interference member 429 is located adjacent to an end of the first pivoting rod 453 at a first point S1. The first pivoting rod 453 is located adjacent to the first tray 401 at a second point S2 between the first pivot pin 455 and the first point S1.

When the first push rod 451 linearly moves away from the first pin hole 491 by an external force in FIG. 11, the first pivoting rod 453 may first interact with the interference member 429 at the first point S1 while pivoting clockwise. After the interaction occurs at the first point S1, when the first push rod 451 further moves linearly, the first pivoting rod 453 may interact with the first tray 401 at the second point S2 while further pivoting. For example, in a state illustrated in FIG. 11, when the first push rod 451 linearly moves in the first section I1 by an external force, the first pivoting rod 453 may interact with the interference member 429 to release the second tray from the first housing 101. In the state in which the first push rod 451 moves through the first section I1, interaction does not occur at the second point S2. Thus, the first tray 401 may still maintain the state of being mounted in the socket 119. When the first push rod 451 linearly moves through the second section I2 exceeding the first section I1 to move away from the first pin hole 491, the interaction occurs at the second point S2, and the first pivoting rod 453 may separate the first tray 401 from the socket 119.

Figure 14:
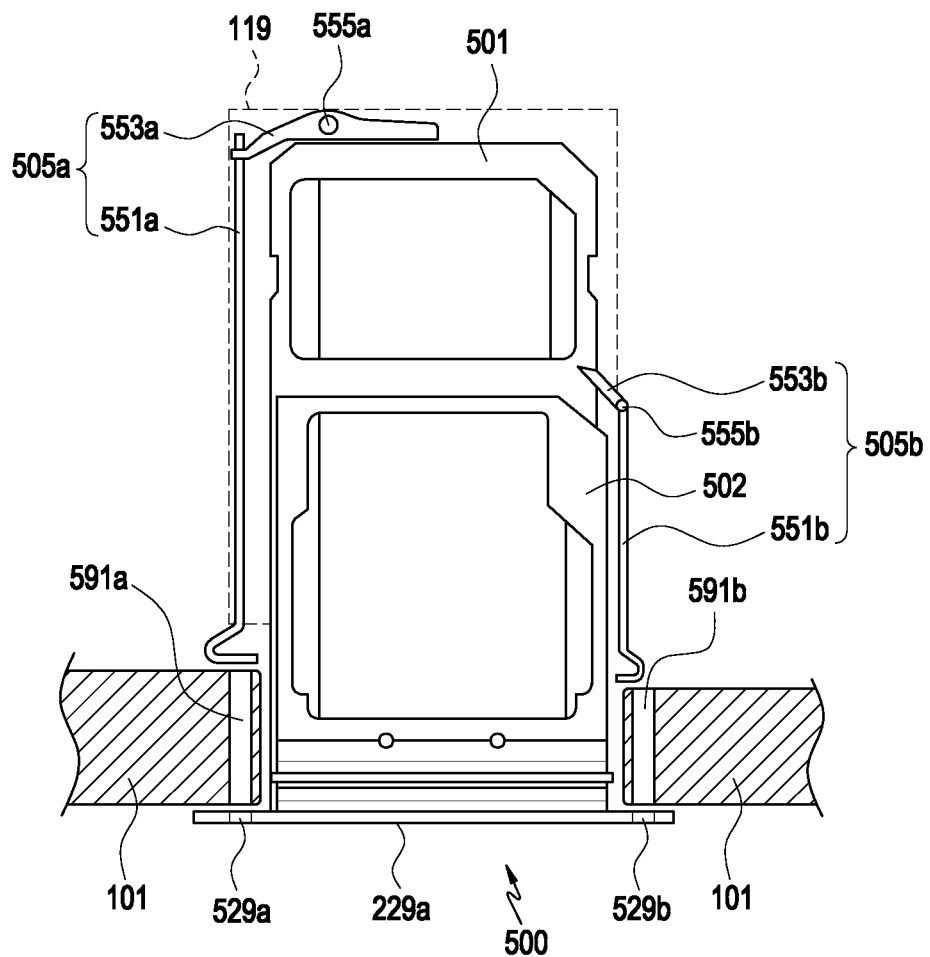
FIG. 14 is a diagram illustrating a plan view of another modification of the storage medium mounting structure in an electronic device, according to an embodiment.
Figures 15, 16:
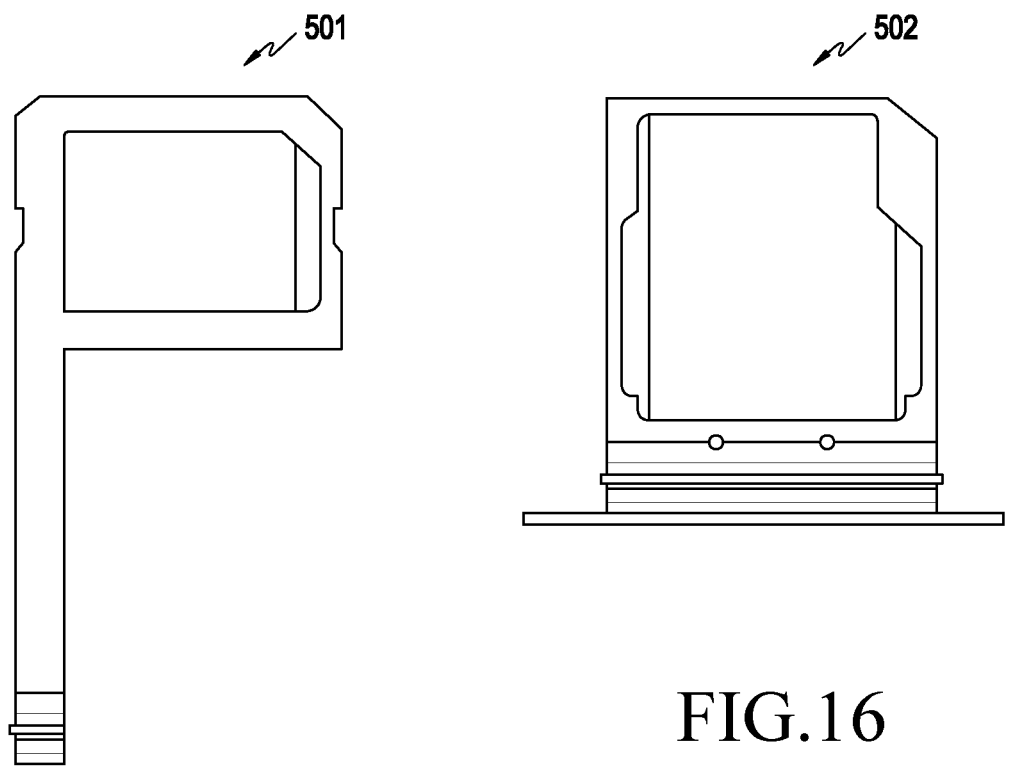
FIG. 15 is a diagram illustrating a plan view of a first tray in the mounting structure of FIG. 14, according to an embodiment.
FIG. 16 is a diagram illustrating plan view of a second tray in the mounting structure of FIG. 14, according to an embodiment.

FIG. 14 is a diagram illustrating a plan view of another modification of a storage medium mounting structure in an electronic device 100, according to an embodiment. FIG. 15 is a diagram illustrating a plan view of a first tray 501 in the mounting structure of FIG. 14, according to an embodiment. FIG. 16 is a plan view of a second tray 502 in the mounting structure of FIG. 14, according to an embodiment.

Referring to FIGS. 14 to 16, the mounting structure may at least partially release or separate the tray structure 500 from the socket 119 or the first housing 101, and includes a first separation device 505a configured to separate the first tray 501 and a second separation device 505b configured to separate the second tray 502.

The first housing 101 includes a first pin hole 591a (e.g., the through hole 169 in FIG. 3) provided therethrough at one side of the insertion hole 161 in the direction in which the first tray 501 or the second tray 502 is inserted. The tray structure 500 includes a first through hole 529a provided in the tray header 229a, for example, the through hole 229b in FIG. 4. In a state in which the tray structure 500 is mounted in the socket 119, the first through hole 529a is aligned with the first pin hole 591a to provide a path through which a separation pin (e.g., the external member 191 in FIG. 1) enters the interior of the first housing 101.

The first separation device 505a includes a first push rod 551a disposed inside the first housing 101 and aligned with the first pin hole 591a. The first push rod 551a is disposed at one side of the socket 119 or inside the socket. 119, and in a state in which one end of the first push rod 551a is aligned with the first pin hole 591a, the first push rod 551a extends along the direction in which the first tray 501 or the second tray 502 is inserted. A separation pin e.g., the external member 191 in FIG. 1) may enter the interior of the first housing 101 through the first pin hole 591a to press the first push rod 551a. The first push rod 551a may linearly move by the external force applied via the external member 191. For example, when the tray structure 500 is inserted into and mounted in the socket 119, one end of the first push rod 551a may move to a position adjacent to the first pin hole 591a and, when an external force is applied thereto by the external member 191, the first push rod 551a may transmit the external force while moving in a direction away from the first pin hole 591a. For example, when the tray structure 500 is mounted on the socket 119 or when an external force is applied by the external member 191, the first push rod 551a may linearly move in the direction in which the tray structure 500 is inserted, or in a direction opposite thereto.

The mounting structure or the first separation device 505a described above includes a first pivoting rod 553a that pivots according to a linear reciprocating motion of the first push rod 551a. The first pivoting rod 553a is pivotally mounted inside the socket 119 or the first housing 101 via a first pivot pin 555a. Unlike the embodiment of FIG. 11, the first pivoting rod 553a may interact with the first tray 501, and may not interact with the second tray 502.

When the first push rod 551a linearly moves away from the first pin hole 591a by an external force in FIG. 14, the first pivoting rod 553a may interact with the first tray 501 while pivoting clockwise. For example, the first tray 501 may be separated from the socket 119 by the operation of the first separation device 505a. When the second tray 502 is in a state of being mounted in the socket 119 together with the first tray 501, the first tray 501 and the second tray 502 may be separated at the same time by the first separation device 505a, For example, the first separation device 505a may separate at least the first tray 501 of the first tray 501 and the second tray 502 from the socket.

The first housing 101 includes a second pin hole 591b provided therethrough at the other side of the insertion hole 161 in the direction in which the first tray 501 or the second tray 502 is inserted. The tray structure 500 includes a second through hole 529b provided in the tray header 229a. In a state in which the tray structure 500 is mounted in the socket 119, the second through hole 529b is aligned with the second pin hole 591b to provide a path through which a separation pin enters the interior of the first housing 101.

The second separation device 505b includes a second push rod 551b disposed inside the first housing 101 and aligned with the second pin hole 591b. The second push rod 551b is disposed at one side of the socket 119 or inside the socket 119, and in a state in which one end of the first push rod 551*b* is aligned with the second pin hole 591*b*, the first push rod 551*b* extends along the direction in which the first tray 501 or the second tray 502 is inserted. A separation pin may enter the interior of the first housing 101 through the second pin hole 591*b* to press the second push rod 551*b*. The second push rod 551*b* may linearly move by the external force applied via the external member 191. For example, when the second tray structure 502 is inserted into and mounted in the socket 119, one end of the second push rod 551*b* may move to a position adjacent to the second pin hole 591*b* and, when an external force is applied thereto by the external member 191, the second push rod 551*b* may transmit the external force while moving in a direction away from the second pin hole 591*b*. For example, when the tray structure 500 is mounted on the socket 119 or when an external force is applied by the external member 191, the second push rod 551*b* may linearly move in the direction in which the tray structure 500 is inserted, or in a direction opposite thereto.

The mounting structure or the second separation device 505*b* described above includes a second pivoting rod 553*b* that pivots according to a linear reciprocating motion of the second push rod 551*b*. The second pivoting rod 553*h* is pivotally mounted inside the socket 119 or the first housing 101 via a second pivot pin 555*b*. The second pivoting rod 553*b* may pivot about the second pivot pin 555*b* while interacting with the other end of the second push rod 551*b*. For example, when the second push rod 551*b* linearly moves, the second pivoting rod 553*b* may pivot about the second pivot pin 555*b* while interacting with the other end of the second push rod 551*b*.

The second pivoting rod 553*h* may interact with the second tray 502 to separate the second tray 502 from the socket 119. For example, when the user inserts the external member 191 through the second pin hole 591*b*, the second separation device 505*b* operates to separate the second tray 502 from the socket 119. Since the first separation device 505*a* does not operate when the second tray 502 is separated, the first tray 501 may be maintained in a state of being mounted on the socket 119, For example, even if the first tray 501 is mounted in the socket 119 in a state of accommodating the subscriber identity module, the user may separate only the second tray 502 or only a storage medium (e.g., the memory card 293 of FIG. 4) disposed in the second tray 502.

As described above, an electronic device includes a housing including a first side with an insertion hole. The electronic device also includes a first tray configured to accommodate at least a SIM. The first tray is inserted into the housing through the insertion hole and is removably (detachably) accommodated within the housing. The electronic device further includes a second tray configured to accommodate at least a memory card. The second tray is inserted into the housing through the insertion hole and is removably accommodated within the housing. In a state of being accommodated within the housing, the first tray and the second tray are at least partially disposed on a same plane, and at least a portion of the second tray is exposed to an outer surface of the housing while closing the insertion hole.

The second tray further includes a second frame defining a space configured to accommodate at least the memory card, and a tray header disposed at one side edge of the second frame. One surface of the tray header is exposed to the outer surface of the housing.

The electronic device described above further includes an accommodation recess disposed in the outer surface of the housing around the insertion hole. At least a portion of the tray header is accommodated in the accommodation recess.

The electronic device as described above further includes a first through hole extending from the bottom of the accommodation recess to the inside of the housing at one side of the insertion hole, and a second through hole formed through the tray header. When the second tray is accommodated within the housing, the first through hole and the second through hole is aligned with each other.

The electronic device described above further includes a first manipulating recess provided in the outer surface of the housing to be in contact with the insertion hole, and a second manipulating recess provided in the second frame or the tray header. When the second tray is accommodated within the housing, the second manipulating recess is exposed to an exterior of the housing through the first manipulating recess.

The electronic device described above further includes an accommodation recess disposed in the outer surface of the housing around the insertion hole to accommodate at least a portion of the tray header, and a first through hole extending from the bottom of the accommodation recess to the inside of the housing at one side of the insertion hole. When the second tray is accommodated within the housing, the tray header closes the first through hole, and when the second tray is separated from the housing, the first through hole is exposed to the exterior of the housing.

The electronic device described above further includes a socket mounted inside the housing and aligned with the insertion hole. At least a portion of the first tray or the second tray is mounted on the socket.

The electronic device described above further includes a first pin hole formed through the housing along a first direction in which the first tray or the second tray is inserted at one side of the insertion hole. The electronic device also includes a first push rod having a first end aligned with the first pin hole and extending along the first direction. The first push rod reciprocates linearly in the first direction within the housing. The electronic device further includes a first pivoting rod mounted adjacent to or inside the socket to interact with a second end of the first push rod. The first pivoting rod is configured to pivot within the housing in response to the linear reciprocating of the first push rod. The first push rod pivots the first pivoting rod while linearly moving by an external force applied through the first pin hole.

When the first push rod moves linearly into a first section, the first pivoting rod may pivot to separate the second tray, mounted on the socket, from the socket. When the first push rod linearly moves into a second section beyond the first section, the first pivoting rod may further pivot to separate the first tray, mounted on the socket, from the socket.

The electronic device described above further includes an interference member extending from one side of the second tray. When the first push rod linearly moves in the first section, the first pivoting rod interacts with the interference member to separate the second tray from the socket.

The electronic device described above further includes a second pin hole formed through the housing along the first direction in which the first tray or the second tray is inserted at one side of the insertion hole. The electronic device also includes a second push rod having a first end aligned with the second pin hole and extending along the first direction. The second push rod is configured to reciprocate linearly in the insertion direction within the housing. The electronic device further includes a second pivoting rod mounted adjacent to or inside the socket to interact with a second end of the second push rod. The second pivoting rod is configured to pivot within the housing in response to the linear reciprocating of the second push rod. By an external force applied through the second pin hole, the second push rod pivots the second pivoting rod while linearly moving, and the second pivoting rod pivots to separate the second tray from the socket. The first pivoting rod may pivot to separate at least the first tray from the socket.

The electronic device described above further includes a first magnetic body mounted on the first tray, and a second magnetic body mounted on the second tray. When the first tray and the second tray are accommodated within the housing, the second magnetic body is disposed adjacent to the first magnetic body to generate an attraction force.

The electronic device described above further includes a first guide portion extending from a first side of the first tray in an insertion direction of the first tray, and a second guide portion extending from a first side of the second tray in an insertion direction of the second tray. At least the second tray is inserted into the housing while being guided by the first guide portion or the second guide portion.

When the first tray and the second tray are accommodated within the housing, the first guide portion at least partially surrounds a second side of the second tray, and the second guide portion at least partially surrounds a second side of the first tray.

The electronic device described above further includes a guide recess provided in the inner surface of the first guide portion or the second guide portion and extending along the insertion direction of the first tray or the second tray, and a guide rail protruding from the outer surface of a second side of the second tray or the outer surface of a second side of the first tray and extending along the insertion direction of the first tray or the second tray. The guide rail is engaged with the guide recess to guide at least the second tray so as to be inserted into the housing.

A storage medium mounting tray structure of an electronic device includes a first tray configured to accommodate a SIM. The first tray is inserted into a housing of the electronic device and is removably accommodated within the housing of the electronic device. The electronic device also includes a second tray configured to accommodate a memory card. The second tray is inserted into the housing of the electronic device and is removably accommodated in the housing of the electronic device, wherein, in the state of being accommodated within the housing of the electronic device. The first tray and the second tray are at least partially disposed on a same plane, and the second tray includes a tray header exposed to an outer surface of the housing.

The second tray further includes a through hole formed through the tray header.

An electronic device includes a housing including a first side with an insertion hole, and a first manipulating recess provided in an outer surface of the housing and in contact with the insertion hole. The electronic device also includes a tray structure including a first tray inserted into the housing through the insertion hole and removably accommodated within the housing, and a second tray inserted into the housing through the insertion hole and removably accommodated within the housing. In a state of being accommodated within the housing, the first tray and the second tray are at least partially disposed on a same plane, and at least a portion of the second tray is exposed to an outer surface of the housing while closing the insertion hole.

The electronic device described above further includes an accommodation recess provided in the outer surface of the housing around the insertion hole. The second tray includes a second frame accommodated inside the housing, and a tray header disposed at a side edge of the second frame and accommodated within the accommodation recess. In a state in which the tray header is accommodated in the accommodation recess, a portion of the tray header is exposed to the outside of the housing through the first manipulating recess.

The electronic device described above further includes a first through hole extending into the housing from a bottom of the accommodation recess at a side of the insertion hole.

In the foregoing detailed description, embodiments have been described. However, it will be evident to a person ordinarily skilled in the art that various modifications can be made without departing from the scope of the disclosure as defined by the appended claims and their equivalents. For example, in the above detailed description, a notebook computer is an example of the electronic device, but this is merely an embodiment, and the electronic device referred to in this document may include another small and/or portable electronic device, such as a tablet PC or a mobile communication terminal.

While the disclosure has been shown and described with reference to certain embodiments thereof, it will be understood by those skilled in the art that various changes in firm and details may be made therein without departing from the scope of the disclosure. Therefore, the scope should not be limited to the embodiments, but should be defined by the appended claims and equivalents thereof.

What is claimed is:
1. An electronic device comprising:
   a housing including an insertion hole formed through one side thereof;
   a first tray configured to accommodate at least a subscriber identity module of the subscriber identity module (SIM) and a memory card, wherein the first tray is inserted into the housing through the insertion hole and removably accommodated in the housing; and
   a second tray configured to accommodate at least the memory card of the subscriber identity module and the memory card, wherein the second tray is inserted into the housing through the insertion hole and removably accommodated in the housing,
   wherein, in a state of being accommodated in the housing, the first tray and the second tray are at least partially located on a same plane, and at least a portion of the second tray is exposed to an outer surface of the housing while closing the insertion hole.

2. The electronic device of claim 1, wherein the second tray further includes:
   a second frame defining a space that accommodates therein at least the memory card of the subscriber identity module and the memory card; and
   a tray header disposed on one side edge of the second frame,
   wherein one surface of the tray header is exposed to an outer surface of the housing.

3. The electronic device of claim 2, further comprising:
   an accommodation recess provided in an outer surface of the housing around the insertion hole,
   wherein at least a portion of the tray header is accommodated in the accommodation recess.

4. The electronic device of claim 3, further comprising:
   a first through hole extending into the housing from a bottom of the accommodation recess at one side of the insertion hole; and
   a second through hole provided through the tray header, wherein, when the second tray is accommodated in the housing, the first through hole and the second through hole are aligned with each other.

5. The electronic device of claim 2, further comprising:
a first manipulating recess provided in the outer surface of the housing to be in contact with the insertion hole; and
a second manipulating recess provided in the second frame or the tray header,
wherein, when the second tray is accommodated in the housing, the second manipulating recess is exposed to an outside of the housing through the first manipulating recess.

6. The electronic device of claim 5, further comprising:
an accommodation recess provided in the outer surface of the housing around the insertion hole to accommodate at least a portion of the tray header; and
a first through hole extending into the housing from a bottom of the accommodation recess at one side of the insertion hole,
wherein, when the second tray is accommodated in the housing, the tray header closes the first through hole, and
when the second tray is separated from the housing, the first through hole is exposed to the outside of the housing.

7. The electronic device of claim 1, further comprising:
a socket mounted inside the housing and aligned with the insertion hole, wherein at least a portion of the first tray or the second tray is mounted on the socket;
a first pin hole formed through the housing along a direction in which the first tray or the second tray is inserted (hereinafter, "insertion direction") at one side of the insertion hole;
a first push rod having one end aligned with the first pin hole and extending along the insertion direction, wherein the first push rod is configured to reciprocate linearly in the insertion direction within the housing; and
a first pivoting rod mounted adjacent to or inside the socket to interfere with another end of the first push rod, wherein the first pivoting rod is configured to pivot within the housing in response to the linear reciprocating of the first push rod,
wherein the first push rod is configured to pivot the first pivoting rod while linearly moving by an external force applied through the first pin hole.

8. The electronic device of claim 7, wherein, when the first push rod moves linearly in a first section, the first pivoting rod pivots to separate the second tray mounted on the socket from the socket, and
when the first push rod linearly moves in a second section exceeding the first section, the first pivoting rod further pivots to separate the first tray mounted on the socket from the socket.

9. The electronic device of claim 8, further comprising:
an interference member extending from one side of the second tray,
wherein, when the first push rod linearly moves in the first section, the first pivoting rod interferes with the interference member to separate the second tray from the socket.

10. The electronic device of claim 7, further comprising:
a second pin hole formed through the housing along a direction in which the first tray or the second tray is inserted at the one side of the insertion hole;
a second push rod having one end aligned with the second pin hole and extending along the insertion direction;

wherein the second push rod reciprocates linearly in the insertion direction within the housing; and
a second pivoting rod mounted adjacent to or inside the socket to interfere with another end of the second push rod, wherein the second pivoting rod is configured to pivot within the housing in response to the linear reciprocating of the second push rod,
wherein, by an external force applied through the second pin hole, the second push rod pivots the second pivoting rod while linearly moving, and the second pivoting rod pivots to separate the second tray from the socket, and
the first pivoting rod pivots to separate at least the first tray of the first tray and the second tray from the socket.

11. The electronic device of claim 1, further comprising:
a first magnetic body mounted on the first tray; and
a second magnetic body mounted on the second tray,
wherein, when the first tray and the second tray are accommodated in the housing, the second magnetic body is disposed adjacent to the first magnetic body to generate an attraction force.

12. The electronic device of claim 1, further comprising:
a first guide portion extending from one side of the first tray in an insertion direction of the first tray; and
a second guide portion extending from one side of the second tray in an insertion direction of the second tray,
wherein at least the second tray of the first tray and the second tray is inserted into the housing while being guided by the first guide portion or the second guide portion.

13. The electronic device of claim 12, wherein, when the first tray and the second tray are accommodated in the housing, the first guide portion at least partially surrounds another side of the second tray, and the second guide portion at least partially surrounds another side of the first tray.

14. The electronic device of claim 12, further comprising:
a guide recess provided in an inner surface of the first guide part or the second guide portion and extending along an insertion direction of the first tray or the second tray; and
a guide rail protruding from an outer surface of another side of the second tray or from an outer surface of another side of the first tray and extending along the insertion direction of the first tray or the second tray,
wherein the guide rail is engaged with the guide recess to guide at least the second tray of the first tray and the second tray so as to be inserted into the housing.

15. A storage medium mounting tray e of an electronic device, the tray structure comprising:
a first tray configured to accommodate a subscriber identity module, wherein the first tray is inserted into a housing of the electronic device and removably accommodated in the housing of the electronic device; and
a second tray configured to accommodate a memory card, wherein the second tray is inserted into the housing of the electronic device and removably accommodated in the housing of the electronic device,
wherein, in a state of being accommodated in the housing of the electronic device, the first tray and the second tray are at least partially positioned on a same plane, and the second tray includes a tray header exposed to an outer surface of the housing.

16. The tray structure of claim 15, wherein the second tray further comprises a through hole formed through the tray header.

17. An electronic device comprising:
a housing including a first side with an insertion hole;

a first manipulating recess provided in an outer surface of the housing and in contact with the insertion hole; and a tray structure including a first tray inserted into the housing through the insertion bole and removably accommodated within the housing, and a second tray inserted into the housing through the insertion hole and removably accommodated within the housing, wherein, in a state of being accommodated within the housing, the first tray and the second tray are at least partially disposed on a same plane, and at least a portion of the second tray is exposed to the outer surface of the housing while closing the insertion hole.

18. The electronic device of claim 17, further comprising:

an accommodation recess disposed in the outer surface of the housing around the insertion hole, wherein the second tray comprises a second frame accommodated inside the housing, and a tray header disposed at a side edge of the second frame and accommodated within the accommodation recess, and wherein, in a state in which the tray header is accommodated within the accommodation recess, a portion of the tray header is exposed to an exterior of the housing through the first manipulating recess.

19. The electronic device of claim 18, further comprising:

a first through hole extending into the housing from a bottom of the accommodation recess at a side of the insertion hole.

* * * * *